(12) United States Patent
Kato et al.

(10) Patent No.: US 12,128,663 B2
(45) Date of Patent: Oct. 29, 2024

(54) PRESSURE BONDING DEVICE AND METHOD FOR MANUFACTURING DISPLAY DEVICE

(71) Applicant: Japan Display Inc., Tokyo (JP)

(72) Inventors: Takayuki Kato, Tokyo (JP); Shinichiro Tanaka, Tokyo (JP); Makoto Ishikawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/218,947

(22) Filed: Jul. 6, 2023

(65) Prior Publication Data

US 2023/0347638 A1    Nov. 2, 2023

Related U.S. Application Data

(60) Division of application No. 17/035,004, filed on Sep. 28, 2020, now Pat. No. 11,731,414, which is a
(Continued)

(30) Foreign Application Priority Data

Mar. 29, 2018   (JP) ................. 2018-066080

(51) Int. Cl.
*B32B 37/10*    (2006.01)
*B32B 1/00*    (2024.01)
(Continued)

(52) U.S. Cl.
CPC ............ *B32B 37/1018* (2013.01); *B32B 1/00* (2013.01); *B32B 3/16* (2013.01); *B32B 37/0046* (2013.01); *B32B 2457/20* (2013.01)

(58) Field of Classification Search
CPC ......... B32B 1/00; B32B 2457/20; B32B 3/16; B32B 37/0046; B32B 37/12; G09F 9/00
See application file for complete search history.

(56) References Cited

U.S. PATENT DOCUMENTS

| | | |
|---|---|---|
| 2016/0279915 A1 | 9/2016 | Uemura |
| 2018/0178499 A1 | 6/2018 | Uemura |
| 2021/0008862 A1 | 1/2021 | Kato et al. |

FOREIGN PATENT DOCUMENTS

| | | |
|---|---|---|
| CN | 107020785 A | 8/2017 |
| JP | S61-182239 A | 8/1986 |

(Continued)

OTHER PUBLICATIONS

Translation of WO2019188310.*

(Continued)

*Primary Examiner* — Sonya M Sengupta
(74) *Attorney, Agent, or Firm* — K&L Gates LLP

(57) ABSTRACT

According to an aspect, a pressure bonding device is configured to bond, to a plate-like first workpiece having a curved surface part, a plurality of plate-like second workpieces smaller than the first workpiece. The pressure bonding device includes: a vacuum chamber; a stage disposed in the vacuum chamber and having a shape extending along a first surface of the curved surface part of the first workpiece so as to fix the first surface on the stage; and a bonding unit configured to deform an elastic diaphragm by internal pressure and pressure-bond one of the second workpieces to a second surface of the first workpiece. A plurality of the bonding units are disposed facing the stage.

4 Claims, 14 Drawing Sheets

Related U.S. Application Data continuation of application No. PCT/JP2019/010378, filed on Mar. 13, 2019.

(51) Int. Cl.
*B32B 3/16* (2006.01)
*B32B 37/00* (2006.01)

(56) References Cited

FOREIGN PATENT DOCUMENTS

| | | |
|---|---|---|
| JP | H08-097110 A | 4/1996 |
| JP | 2015-079587 A | 4/2015 |
| JP | 2015-092422 A | 5/2015 |
| JP | 2016-179600 A | 10/2016 |
| TW | 201634978 A | 10/2016 |

OTHER PUBLICATIONS

Written Opinion for International Patent Application No. PCT/JP2019/010378 mailed on May 7, 2019. 7 pages.

Office Action issued in related Chinese Patent Application No. 20190023219.4 on Sep. 26, 2021 and English translation of same. 16 pages.

\* cited by examiner

PRESSURE BONDING DEVICE AND METHOD FOR MANUFACTURING DISPLAY DEVICE

CROSS-REFERENCE TO RELATED APPLICATION

The present application of a division of U.S. patent application Ser. No. 17/035,004, filed on Sep. 28, 2020, which is a continuation of International Patent Application No. PCT/2019/010378 filed on Mar. 13, 2019, which claims the benefit of priority from Japanese Patent Application No. 2018-066080 filed on Mar. 29, 2018, the entire contents of which are incorporated herein by reference.

BACKGROUND

1. Technical Field

What is disclosed herein relates to a pressure bonding device and a method for manufacturing a display device.

2. Description of the Related Art

Widely known are display devices having a curved surface. Japanese Patent Application Laid-open Publication No. 2015-92422, for example, describes a technology that employs a cover glass serving as a front plate having a curved surface.

Bonding methods for bonding a display panel to a cover glass are broadly classified into a method using a roller described in Japanese Patent Application Laid-open Publication No. 2016-179600 (JP-A-2016-179600) and a method using a diaphragm described in Japanese Patent Application Laid-open Publication No. 2015-79587 (JP-A-2015-79587).

If a plurality of display panels are bonded to one front plate by the technology using a roller described in JP-A-2016-179600, the roller is pressed against the curved surface from the end of the display panels, thereby causing difference in the amount of partial elongation in the display panels. As a result, the display quality of the display panels may possibly deteriorate.

If a plurality of display panels are attached to a diaphragm and bonded to one front plate by the technology using a diaphragm described in JP-A-2015-79587, the display panel disposed at the center with respect to a convex part or a concave part of the front plate is not pressed against the curved surface from the end of the display panel. By contrast, the display panels disposed facing the ends of the convex part or the concave part of the front plate are pressed against the curved surface from the end of the display panels, thereby causing difference in the amount of partial elongation in the display panels. As a result, the display quality of the display panels may possibly deteriorate.

There is a need for a pressure bonding device that bonds, to a plate-like first workpiece having a curved surface part, a plurality of plate-like second workpieces smaller than the first workpiece while reducing difference in the amount of partial elongation generated in the second workpieces. There is a need for a method for manufacturing a display device that reduces deterioration in display quality of display panels.

SUMMARY

According to an aspect, a pressure bonding device is configured to bond, to a plate-like first workpiece having a curved surface part, a plurality of plate-like second workpieces smaller than the first workpiece. The pressure bonding device includes: a vacuum chamber; a stage disposed in the vacuum chamber and having a shape extending along a first surface of the curved surface part of the first workpiece so as to fix the first surface on the stage; and a bonding unit configured to deform an elastic diaphragm by internal pressure and pressure-bond one of the second workpieces to a second surface of the first workpiece. A plurality of the bonding units are disposed facing the stage.

According to another aspect, a pressure bonding device is configured to bond a plate-like first workpiece having a curved surface part and a plurality of plate-like second workpieces smaller than the first workpiece. The pressure bonding device includes: a vacuum chamber; a restriction mechanism configured to restrict the shape of the first workpiece; a stage disposed in the vacuum chamber and having a flat surface against which the first workpiece is pressed by the restriction mechanism; and a bonding unit configured to deform an elastic diaphragm by internal pressure and pressure-bond one of the second workpieces to a second surface of the first workpiece. A plurality of the bonding units are disposed facing the stage.

According to another aspect, a method for manufacturing a display device by bonding, to a translucent front plate having a curved surface part, a plurality of display panels smaller than the front plate, the method includes: preparing including attaching the display panels to respective elastic diaphragms and attaching the front plate to a stage facing the diaphragms; and pressure-bonding performed after the preparing and including deforming the diaphragms by individual pressures and pressure-bonding the display panels to different positions on the front plate.

DETAILED DESCRIPTION

Figure 1:
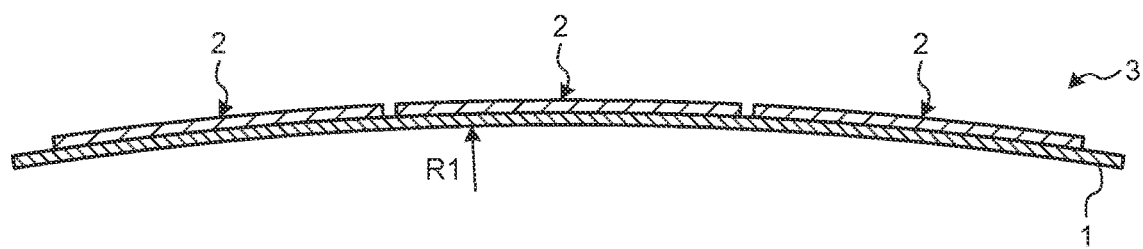
FIG. 1 is a schematic sectional view of a display device according to a first embodiment.

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the invention and easily conceivable by those skilled in the art naturally fall within the scope of the disclosure. To simplify the explanation, the drawings may possibly illustrate the width, the thickness, the shape, and other elements of each unit more schematically than the actual aspect. These elements, however, are given by way of example only and are not intended to limit interpretation of the present disclosure. In the present specification and the figures, components similar to those previously described with reference to previous figures are denoted by the same reference numerals, and detailed explanation thereof may be appropriately omitted.

First Embodiment

Figure 2:
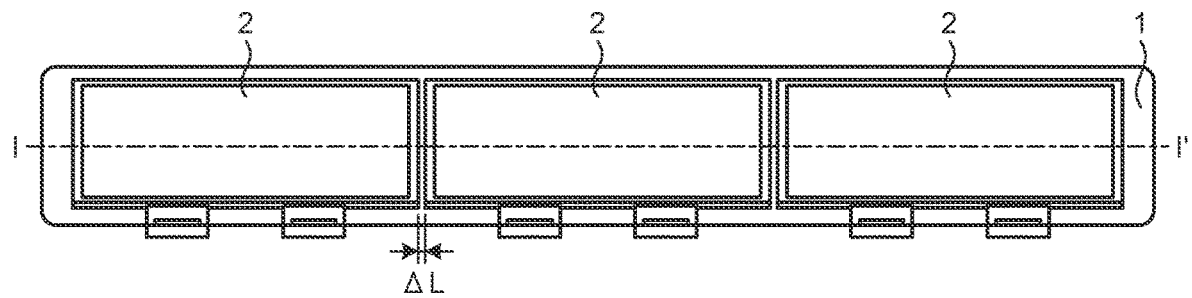
FIG. 2 is a schematic plan view of the display device according to the first embodiment.

FIG. 1 is a schematic sectional view of a display device according to a first embodiment. FIG. 2 is a schematic plan view of the display device according to the first embodiment. FIG. 1 is a sectional view along line I-I' of FIG. 2. As illustrated in FIG. 1, a display device 3 according to the first embodiment includes a front plate 1 and three display panels 2. The three display panels 2 are bonded to the front plate 1 in a manner aligned with a gap ΔL illustrated in FIG. 2 interposed therebetween. The display panel 2 is smaller than the first plate 1 in planar view.

The front plate 1 is a cover member that protects the display panels 2. The display panels 2 are disposed on one side of the front plate 1 and bonded to the front plate 1 with an adhesive layer, which is not illustrated, interposed therebetween. The front plate 1 has a rectangular shape when viewed from the front as illustrated in FIG. 2; however, the shape of the front plate 1 is not limited thereto.

As illustrated in FIG. 1, the front plate 1 is curved as a whole with curvature R1. The front plate 1 is made of translucent glass or synthetic resin. Light from the display panel 2 passes through the front plate 1. A viewer can see video that appears to be displayed on a display surface extending along the surface of the front plate 1.

The display panel 2 is a liquid crystal panel or an organic light emitting diode panel (hereinafter, referred to as an OLED panel), for example. The liquid crystal panel or the OLED panel may include a touch panel. If the display panel 2 is a liquid crystal panel, a backlight is provided to the back side of the display panel 2. The display panel 2 includes a first substrate and a second substrate made of glass or the like and a liquid crystal layer sandwiched between the first substrate and the second substrate.

The display panel 2, for example, has a rectangular shape when viewed from the front. The display panel 2 is curved, and both ends of the display panel 2 in one direction are positioned closer to the viewer than the center in the one direction is when viewed from the viewer.

As illustrated in FIG. 1, the curvature of the curved surface part of the front plate 1 is constant across the entire surface. The front surface of the display panel 2 is bonded to a second surface 1R of the front plate 1.

Figure 3:
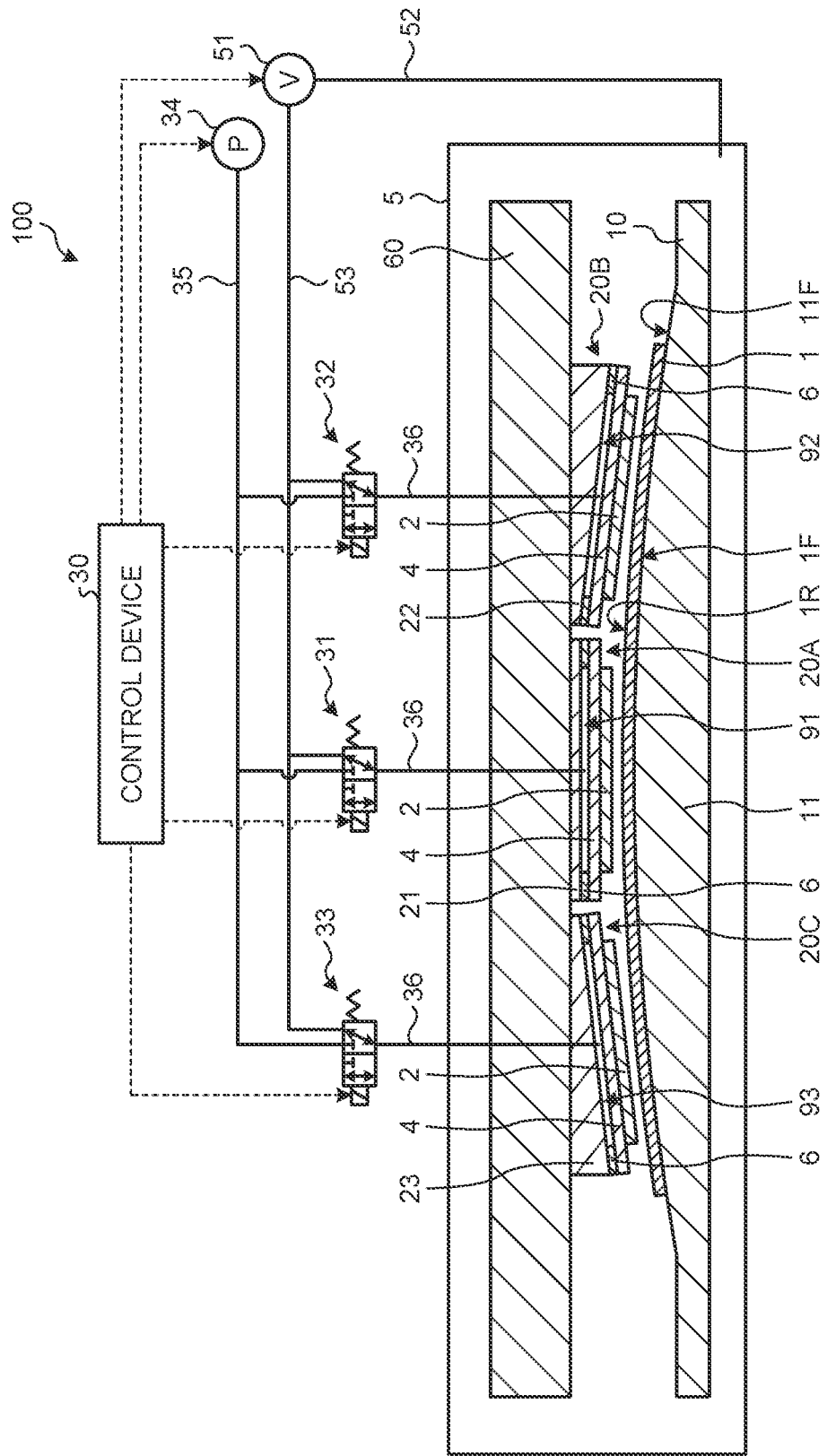
FIG. 3 is a configuration diagram of a pressure bonding device according to the first embodiment.
Figure 4:
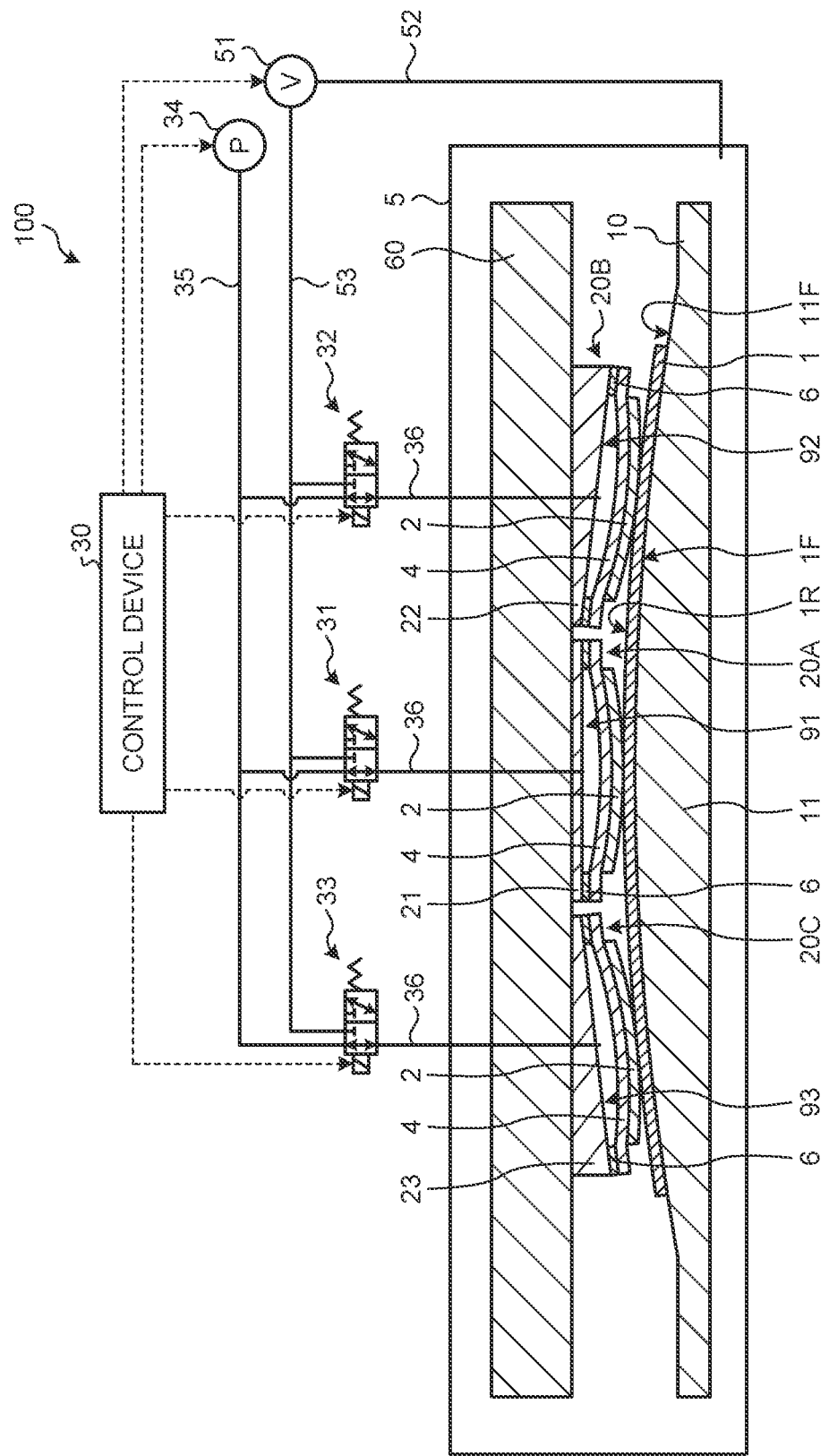
FIG. 4 is a configuration diagram for explaining operations of the pressure bonding device according to the first embodiment.

To manufacture the display device 3 described above, the first embodiment uses a pressure bonding device 100. FIG. 3 is a configuration diagram of the pressure bonding device according to the first embodiment. FIG. 4 is a configuration diagram for explaining operations of the pressure bonding device according to the first embodiment. The pressure bonding device 100 includes a vacuum chamber 5, a vacuum source 51, a pressure source 34, a stage 10, bonding units 20A, 20B, and 20C, a movable base 60, control valves 31, 32, and 33, pipes 36, 35, 52, and 53, and a control device 30.

The vacuum chamber 5 is a container that houses the stage 10, the bonding units 20A, 20B, and 20C, and the movable base 60. The vacuum source 51 is a pump and exhausts air in the vacuum chamber 5 through the pipe 52 to make the pressure in the vacuum chamber 5 lower than the atmospheric pressure.

The stage 10 is a jig disposed in the vacuum chamber 5 to fix the front plate 1 in contact with a fixing part 11 extending along the surface of the curved surface part. The movable base 60 is a jig for positioning the bonding units 20A, 20B, and 20C. The gap between the stage 10 and the movable base 60 can be appropriately changed.

The bonding unit 20A includes a base 21, a sealing member 6, and a diaphragm 4. The sealing member 6 is a member provided on the periphery of the diaphragm 4 to seal a space 91 between the base 21 and the diaphragm 4.

The space 91 is sealed by the base 21, the sealing member 6, and the diaphragm 4. The pipe 36 is inserted into the space 91.

As illustrated in FIG. 3, the attachment surface of the base 21 on which the diaphragm 4 is attached extends along the tangent to a fixing surface 11F of the stage 10 facing the bonding unit 20A at the shortest distance.

The diaphragm 4 is an elastic member. The elastic member is made of sheet-like synthetic rubber or elastomer having a uniform thickness when no pressure is applied thereto. The elastic member may be natural rubber.

The bonding unit 20B includes a base 22, the sealing member 6, and the diaphragm 4. The base 22 of the bonding unit 20B is different in shape from the base 21 of the bonding unit 20A. As illustrated in FIG. 3, the attachment surface of the base 22 on which the diaphragm 4 is attached inclines in the bonding unit 20B. The angle of inclination of the attachment surface is formed along the tangent to the fixing surface 11F of the stage 10 facing the bonding unit 20B at the shortest distance. Explanation of the sealing member 6 and the diaphragm 4 of the bonding unit 20B is omitted because they are the same as those of the bonding unit 20A.

A space 92 is sealed by the base 22, the sealing member 6, and the diaphragm 4. The pipe 36 is inserted into the space 92.

The bonding unit 20C includes a base 23, the sealing member 6, and the diaphragm 4. The base 23 of the bonding unit 20C is different in shape from the base 21 of the bonding unit 20A. As illustrated in FIG. 3, the attachment surface of the base 23 on which the diaphragm 4 is attached inclines in the bonding unit 20C. The angle of inclination of the attachment surface is formed along the tangent to the fixing surface 11F of the stage 10 facing the bonding unit 20C at the shortest distance. Explanation of the sealing member 6 and the diaphragm 4 of the bonding unit 20C is omitted because they are the same as those of the bonding unit 20A.

A space 93 is sealed by the base 23, the sealing member 6, and the diaphragm 4. The pipe 36 is inserted into the space 93.

The shortest normal distances between the display panels 2 on the respective bonding units 20A, 20B, and 20C and the front plate 1 are equal on the normal line of the fixing surface 11F of the stage 10.

The pressure source 34 is a pump and supplies gas to the spaces 91, 92, and 93 through the pipes 35 and 36. The gas may be air or another gas, such as nitrogen.

When the pressure in the vacuum chamber 5 is reduced, the pressure in the space between the bonding units 20A, 20B, and 20C and the stage 10 is at least reduced.

The control valves 31, 32, and 33 are electromagnetic valves each including a solenoid. The solenoids operate based on instructions from the control device 30, thereby switching the control valves 31, 32, and 33 between a depressurization state and a pressurization state. While the control valves 31, 32, and 33 have 2-position 3-port specifications, they do not necessarily have the specifications. The control valves 31, 32, and 33 may have 3-position 3-port specifications, for example, to select any one of the depressurization state, a closure state, and the pressurization state.

In the depressurization state, the control valves 31, 32, and 33 couple the vacuum source 51 to the spaces 91, 92, and 93, respectively, through their corresponding pipes 36 and the pipe 53. In the depressurization state, the control valves 31, 32, and 33 supply no gas to the spaces 91, 92, and 93, respectively, from the pressure source 34.

In the pressurization state, the control valves 31, 32, and 33 couple the pressure source 34 and the spaces 91, 92, and 93, respectively, through their corresponding pipes 36 and the pipe 35. In the pressurization state, the control valves 31, 32, and 33 supply gas supplied from the pressure source 34 to the spaces 91, 92, and 93, respectively.

The control device 30 is a computer including at least a central processing unit (CPU) serving as an arithmetic device and a memory serving as a storage device, for example. The control device 30 executes a computer program using these hardware resources, thereby implementing various functions.

Specifically, the control device 30 reads and loads a computer program stored in a predetermined storage unit (not illustrated) on a memory and causes the CPU to execute instructions included in the computer program loaded on the memory. The control device 30 according to the first embodiment controls operations of the vacuum source 51 to control the pressure in the vacuum chamber 5. The control device 30 also controls operations of the control valves 31, 32, and 33 to control the pressure in the spaces 91, 92, and 93.

The following describes a method for manufacturing a display device using the pressure bonding device 100 described above. At a preparation process, the display panels 2 are attached to the respective diaphragms 4 in the vacuum chamber 5 with an adhesive layer interposed therebetween as illustrated in FIG. 3. The display panels 2 are each provided with an adhesive layer also on the side facing the front plate 1. The adhesive layer on the diaphragm 4 has adhesion less than that of the adhesive layer facing the front plate 1.

At the preparation process, the front plate 1 is fixed in contact with the fixing part 11 and attached to the stage 10 with an adhesive layer interposed therebetween. The front plate 1 may be attached to the stage 10 before, after, or simultaneously with attachment of the display panels 2 to the respective diaphragms 4.

After the preparation process, a depressurization process is performed to reduce the pressure in the vacuum chamber 5. The control device 30 brings the control valves 31, 32, and 33 into the depressurization state and drives the vacuum source 51 to control the operations of the vacuum source 51, thereby controlling the pressure in the vacuum chamber 5.

After the pressure in the vacuum chamber 5 is reduced to a predetermined pressure, a pressure bonding process is performed to bond the display panels 2 to the front plate 1. As illustrated in FIG. 4, the control device 30 brings the control valves 31, 32, and 33 into the pressurization state and increases the pressure in the spaces 91, 92, and 93. At the pressure bonding process, pressure difference is generated between the pressure in the vacuum chamber 5 and the pressure in the spaces 91, 92, and 93, thereby deforming the diaphragms 4. Consequently, the volume of the spaces 91, 92, and 93 increases.

As a result, the distance between the diaphragms 4 and the fixing part 11 of the stage 10 decreases, thereby bringing the display panels 2 attached to the respective diaphragms 4 into contact with the front plate 1.

Figure 5:
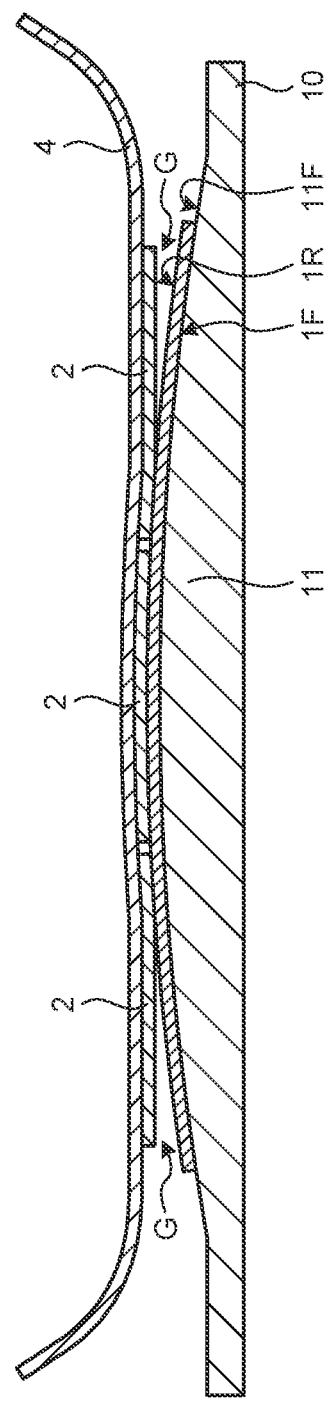
FIG. 5 is a view for explaining a diaphragm of a pressure bonding device according to a comparative example.

FIG. 5 is a view for explaining the diaphragm of a pressure bonding device according to a comparative example. As illustrated in FIG. 5, if a plurality of display panels 2 are attached to the diaphragm 4 and bonded to the front plate 1, the display panel 2 disposed at the center with respect to a convex part or a concave part of the front plate 1 is not pressed against the curved surface from the end of the display panel 2. By contrast, the display panels 2 disposed facing the ends of the convex part or the concave part of the front plate 1 are pressed against the curved surface from the end of the display panels 2, thereby each forming a gap G on one side of the display panel 2. As a result, difference in the amount of partial elongation is generated in the display panels 2 disposed facing the ends of the convex part or the concave part of the front plate 1. Consequently, the display quality of the display panels 2 may possibly deteriorate.

By contrast, as illustrated in FIG. 4, the display panels 2 (three display panels 2) according to the first embodiment are not pressed against the curved surface from the end of the display panels 2. The display panels 2 are each bonded to the front plate 1 from the center toward both ends of the display panel 2. Consequently, difference in the amount of partial elongation is generated on both sides of the display panel 2 with respect to the center and is cancelled out. As a result, deterioration in display quality of the display panels 2 is reduced.

At the pressure bonding process, the spaces 91, 92, and 93 further expand, thereby bonding the entire surfaces of the three display panels 2 to the front plate 1. At a detachment process performed after the pressure bonding process, the control valves 31, 32, and 33 are switched from the pressurization state to the depressurization state so as to detach the diaphragms 4 from the respective display panels 2. Subsequently, the pressure in the vacuum chamber 5 is brought back to the atmospheric pressure, and the display device 3 illustrated in FIGS. 1 and 2 is taken out.

The manufactured display device 3 is mounted on a dashboard of a vehicle, for example. The display device 3 has the advantage that the surface of the display device 3 smoothly fits to the curved interior of the vehicle because the surface of the front plate 1 is curved. The display panels 2 display navigation system, speedometer, tachometer, fuel gauge, and water-temperature gauge, for example.

The display device 3 is not necessarily mounted on a vehicle and may be applied to other electronic apparatuses, such as portable electronic apparatuses. If the display device 3 is mounted on a vehicle, video displayed by the display device 3 is not limited to vehicle gauges and may be a map of the car navigation system, for example.

The display panel 2 may be an organic EL panel. If the display panel 2 is an organic EL panel, no backlight is required. The display panel 2 may have a touch detection function. In other words, a touch panel may be provided in the display panel 2 or on the surface of the display panel 2.

The front plate 1 is not necessarily made of glass. The front plate 1 may be made of translucent synthetic resin, for example.

As described above, the pressure bonding device 100 includes the vacuum chamber 5, the stage 10, and the bonding units 20A, 20B, and 20C. The bonding units 20A, 20B, and 20C are disposed facing one stage 10. The stage 10 is disposed in the vacuum chamber 5 and has a shape extending along a first surface 1F of the curved surface part of the front plate 1 so as to fix the first surface 1F on the stage 10. The bonding units 20A, 20B, and 20C deform the respective elastic diaphragms 4 by internal pressures, thereby each pressure-bonding one display panel 2 to the second surface 1R of the front plate 1.

This configuration reduces difference in the amount of partial elongation generated in the display panels 2. The pressure bonding device 100 can simultaneously bond a plurality of display panels 2 serving as plate-like second workpieces to the front plate 1 serving as a plate-like first workpiece having a curved surface part. Consequently, the display device 3 can be manufactured in a shorter time at a lower cost.

In the method for manufacturing the display device 3 described above, the bonding units 20A, 20B, and 20C bond the respective display panels 2 to the front plate 1. Consequently, the pressure for pressing the display panels 2 can be sufficiently applied to the front plate 1. As a result, the display panels 2 are stably bonded to the front plate 1, thereby reducing deterioration in display quality. In addition, the display panels 2 are less likely to come off the front panel 1.

If the display panels 2 are liquid crystal panels, misalignment between an array substrate and a counter substrate is prevented because of reduction in the difference in the amount of partial elongation generated in the display panels 2. As a result, deterioration in display quality is reduced.

First Modification of the First Embodiment

Figure 6:
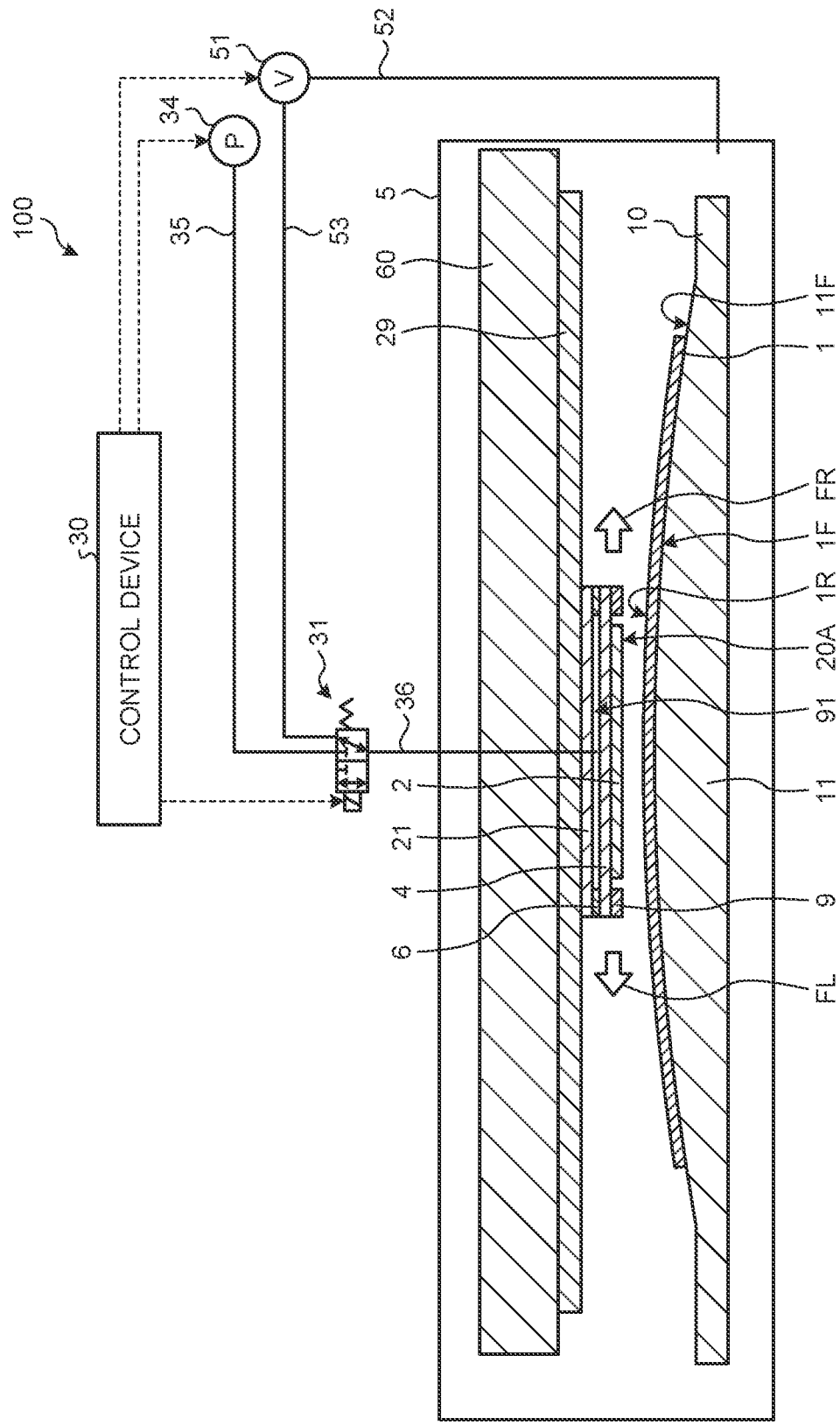
FIG. 6 is a configuration diagram for explaining operations of a pressure bonding device according to a first modification of the first embodiment.

FIG. 6 is a configuration diagram for explaining operations of a pressure bonding device according to a first modification of the first embodiment. In the description of the first modification of the first embodiment, the same components as those according to the first embodiment are denoted by the same reference numerals, and detailed explanation thereof is omitted.

In the same manner as the pressure bonding device according to the first embodiment, the fixing surface 11F of the stage 10 of the pressure bonding device 100 according to the first modification of the first embodiment has a curved surface part. The stage 10 according to the first modification of the first embodiment has the fixing part 11 described in the first embodiment.

Unlike the pressure bonding device according to the first embodiment, the pressure bonding device 100 according to the first modification of the first embodiment includes the bonding unit 20A according to the first embodiment alone. The bonding unit 20A is attached to the movable base 60 with a guide mechanism 29 interposed therebetween. The guide mechanism 29 is a linear motion guide mechanism that supports the bonding unit 20A movably in a direction FL and a direction FR opposite to the direction FL along the longitudinal direction of the front plate 1 illustrated in FIG. 6. In the bonding unit 20A, the display panel 2 is attached to the diaphragm 4 with an adhesive layer interposed therebetween.

A mask 9 is a cushioning material that reduces the force of the bonding unit 20A abutting on the already bonded display panels 2 when a plurality of display panels 2 are bonded to the front plate 1.

With this structure, the first modification of the first embodiment provides the advantageous effects similar to those of the first embodiment. In addition, the pressure bonding device 100 according to the first modification of the first embodiment can bond the display panels 2 at desired positions depending on the size of a various kinds of front plate 1.

Second Embodiment

Figure 7:
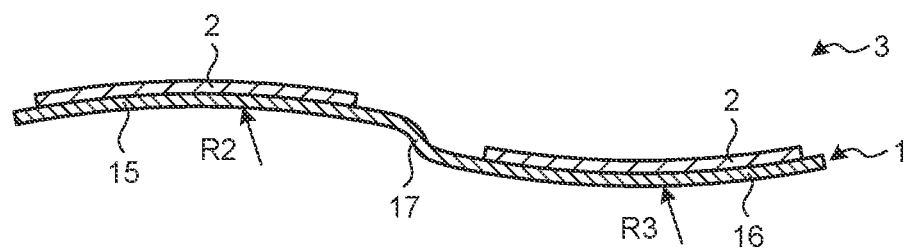
FIG. 7 is a schematic sectional view of a display device according to a second embodiment.
Figure 8:
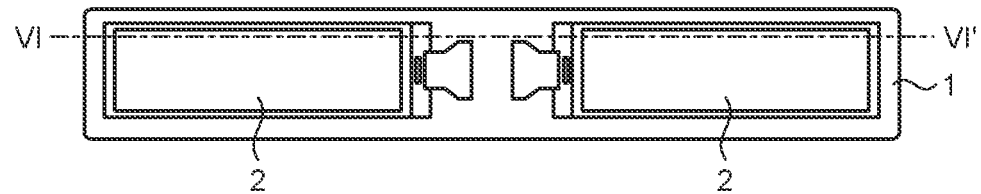
FIG. 8 is a schematic plan view of the display device according to the second embodiment.

FIG. 7 is a schematic sectional view of a display device according to a second embodiment. FIG. 8 is a schematic plan view of the display device according to the second embodiment. FIG. 7 is a sectional view along line VI-VI' of FIG. 8. In the description of the second embodiment, the same components as those according to the first embodiment are denoted by the same reference numerals, and detailed explanation thereof is omitted.

As illustrated in FIG. 7, the front plate 1 according to the second embodiment includes a curved surface part 15 having curvature R2, a curved surface part 16 having curvature R3 different from the curvature R2, and a coupling part 17 that couples the curved surface part 15 and the curved surface part 16. In other words, the front plate 1 is curved such that the curved surface part 15 is a convex surface, and the curved surface part 16 is a concave surface when viewed from the display panel 2, and that the curved surface part 15 is a concave surface, and the curved surface part 16 is a convex surface when viewed from the viewer. As described above, the front plate 1 has the curved surface parts 15 and 16 having different curvatures.

As illustrated in FIGS. 7 and 8, the display panel 2 is curved. Both ends in one direction of the display panel 2 attached to the curved surface part 15 are positioned closer to the viewer than the center in the one direction is when viewed from the viewer. Both ends in one direction of the display panel 2 attached to the curved surface part 16 are positioned farther away from the viewer than the center in the one direction is when viewed from the viewer.

Figure 9:
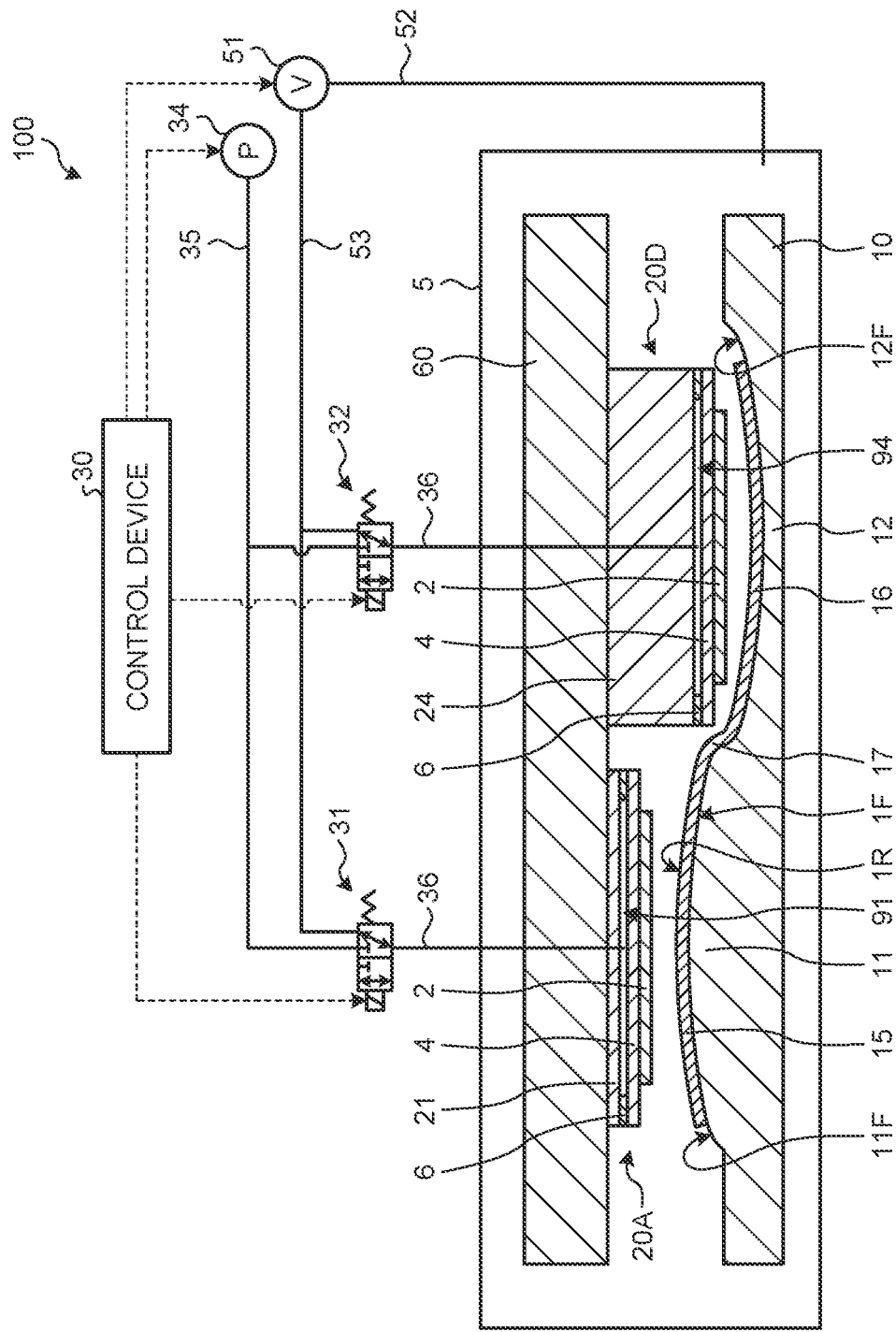
FIG. 9 is a configuration diagram of a pressure bonding device according to the second embodiment.

FIG. 9 is a configuration diagram of a pressure bonding device according to the second embodiment. The stage 10 is a jig disposed in the vacuum chamber 5 to fix the front plate 1 in contact with fixing parts 11 and 12 extending along the first surface 1F of the curved surface parts 15 and 16. The fixing part 11 has a convex shape protruding from the side facing the movable base 60, and the fixing part 12 has a concave shape recessed from the side facing the movable base 60.

A bonding unit 20D includes a base 24, the sealing member 6, and the diaphragm 4. The bonding unit 20D is different from the bonding unit 20A in the shape of the base 24. Specifically, the base 24 is thicker than the base 21. Explanation of the sealing member 6 and the diaphragm 4 of the bonding unit 20D is omitted because they are the same as those of the bonding unit 20A.

As illustrated in FIG. 9, the attachment surface of the base 24 on which the diaphragm 4 is attached extends along the tangent to a fixing surface 12F of the fixing part 12 facing the bonding unit 20D at the shortest distance. The shortest normal distance between the display panel 2 on the bonding unit 20A and the front plate 1 on the normal line of the fixing surface 11F is equal to the shortest normal distance between the display panel 2 on the bonding unit 20D and the front plate 1 on the normal line of the fixing surface 12F.

A space 94 is sealed by the base 24, the sealing member 6, and the diaphragm 4. The pipe 36 is inserted into the space 94.

The following describes a method for manufacturing a display device using the pressure bonding device 100 described above. At the preparation process, the display panels 2 are attached to the respective diaphragms 4 in the vacuum chamber 5 with an adhesive layer interposed therebetween as illustrated in FIG. 9. The display panels 2 are each provided with an adhesive layer also on the side facing the front plate 1. The adhesive layer on the diaphragms 4 has adhesion less than that of the adhesive layer facing the front plate 1.

At the preparation process, the front plate 1 is fixed in contact with the fixing parts 11 and 12 and attached to the stage 10 with an adhesive layer interposed therebetween. The front plate 1 may be attached to the stage 10 before, after, or simultaneously with attachment of the display panels 2 to the respective diaphragms 4.

After the preparation process, the depressurization process is performed to reduce the pressure in the vacuum chamber 5. The control device 30 brings the control valves 31 and 32 into the depressurization state and drives the vacuum source 51 to control the operations of the vacuum source 51, thereby controlling the pressure in the vacuum chamber 5.

Figure 10:
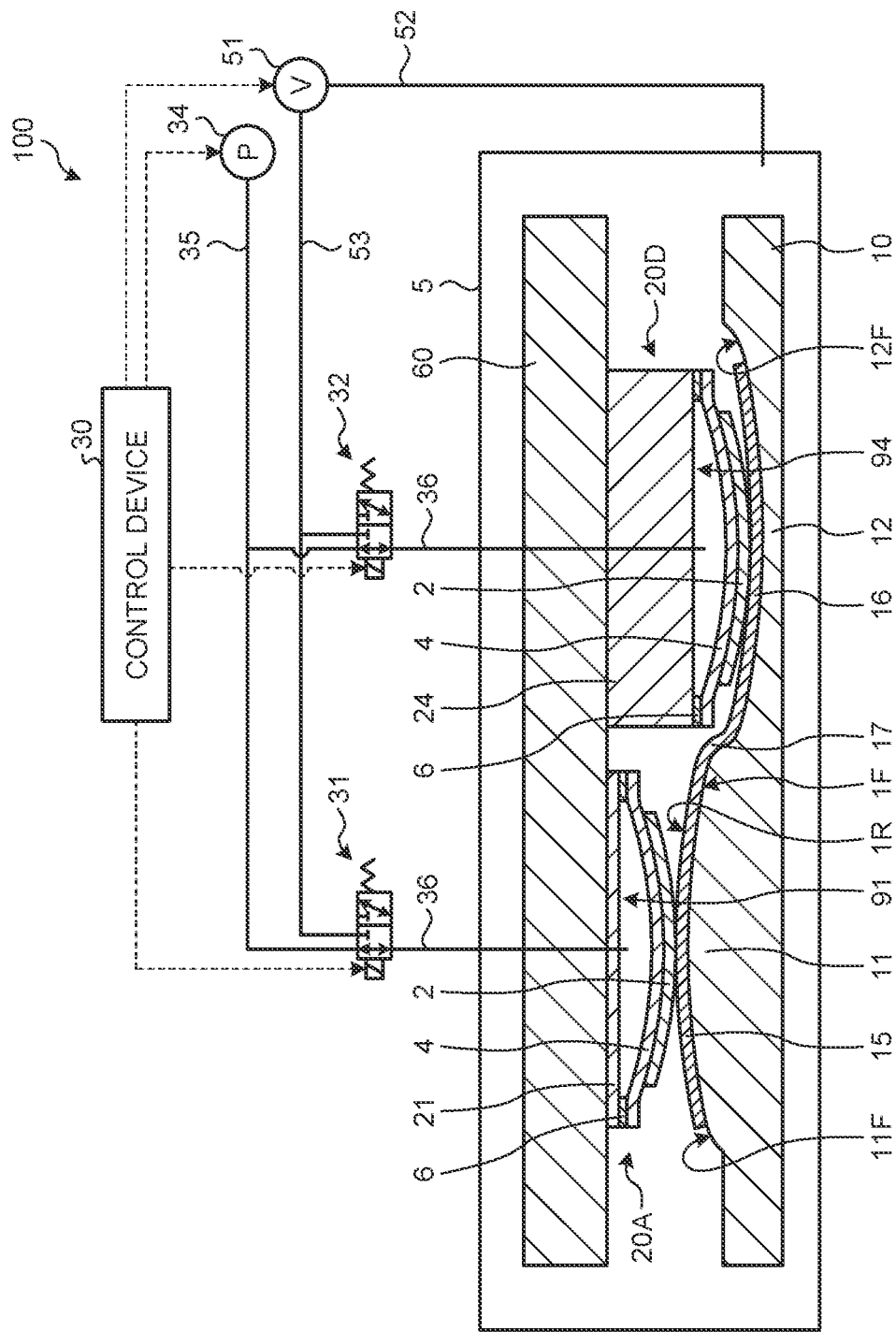
FIG. 10 is a configuration diagram for explaining operations of the pressure bonding device according to the second embodiment.

After the pressure in the vacuum chamber 5 is reduced to predetermined pressure, the pressure bonding process is performed to bond the display panels 2 to the front plate 1. As illustrated in FIG. 10, the control device 30 brings the control valves 31 and 32 into the pressurization state and increases the pressure in the spaces 91 and 94. At the pressure bonding process, pressure difference is generated between the pressure in the vacuum chamber 5 and the pressure in the spaces 91 and 94, thereby deforming the diaphragms 4. Consequently, the volume of the spaces 91 and 94 increases.

As a result, the distance between the diaphragms 4 and the fixing parts 11 and 12 of the stage 10 decreases, thereby bringing the display panels 2 attached to the respective diaphragms 4 into contact with the front plate 1.

As illustrated in FIG. 10, the two display panels 2 according to the second embodiment are not pressed against the curved surface from the end of the display panels 2. The display panels 2 are each bonded to the front plate 1 from the center toward both ends of the display panel 2. Consequently, difference in the amount of partial elongation is generated on both sides of the display panel 2 with respect to the center and is cancelled out. As a result, deterioration in display quality of the display panels 2 is reduced.

At the pressure bonding process, the spaces 91 and 94 further expand, thereby bonding the entire surfaces of the two display panels 2 to the front plate 1. At the detachment process performed after the pressure bonding process, the control valves 31 and 32 are switched from the pressurization state to the depressurization state so as to detach the diaphragms 4 from the respective display panels 2. After the diaphragms 4 are detached from the respective display panels 2, the pressure in the vacuum chamber 5 is brought back to the atmospheric pressure, and the display device 3 illustrated in FIGS. 7 and 8 is taken out.

As described above, the pressure bonding device 100 includes the vacuum chamber 5, the stage 10, and the bonding units 20A and 20D. The stage 10 is disposed in the vacuum chamber 5 and has a shape extending along the first surface 1F of the front plate 1 so as to fix the first surface 1F on the stage 10. The bonding units 20A and 20D deform the respective elastic diaphragms 4 by internal pressures, thereby each pressure-bonding one display panel 2 to the second surface 1R of the front plate 1.

This configuration reduces difference in the amount of partial elongation generated in the display panels 2. The pressure bonding device 100 can simultaneously bond a plurality of display panels 2 serving as the plate-like second workpieces to the front plate 1 serving as the plate-like first workpiece having a curved surface part. Consequently, the display device 3 can be manufactured in a shorter time at a lower cost.

With the base 21 and the base 24 having different thicknesses, the pressure for pressing the display panels 2 can be sufficiently applied to the curved surface part 15 and the curved surface part 16 having different distances from the movable base 60. As a result, the display panels 2 can be bonded to the front plate 1 having concave and convex parts. In addition, the display panels 2 are less likely to come off the front panel 1.

Third Embodiment

Figure 11:
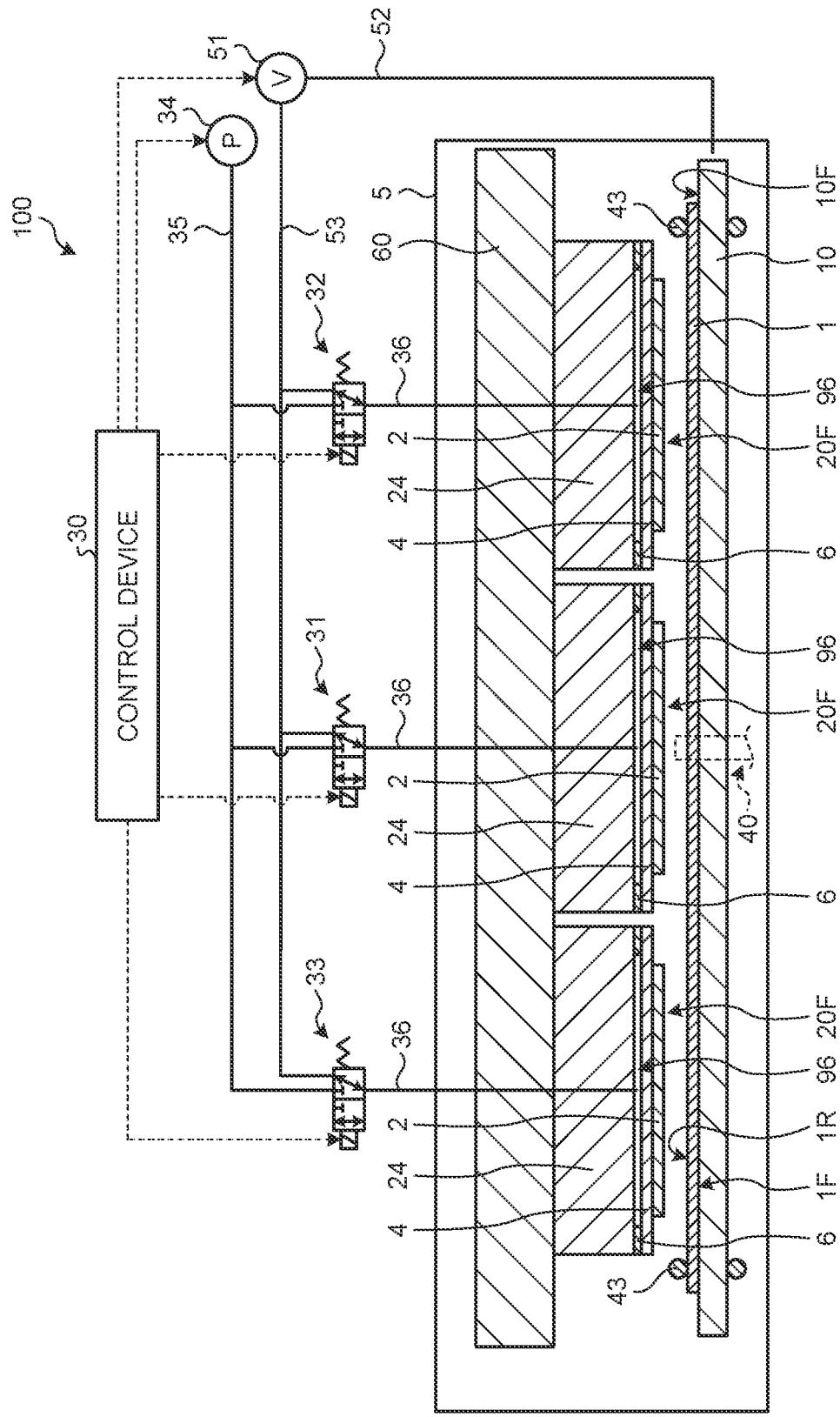
FIG. 11 is a configuration diagram of a pressure bonding device according to a third embodiment.

FIG. 11 is a configuration diagram of a pressure bonding device according to a third embodiment. In the description of the third embodiment, the same components as those according to the first or the second embodiment are denoted by the same reference numerals, and detailed explanation thereof is omitted.

In the pressure bonding device according to the third embodiment, a surface 10F of the stage 10 is a flat surface. The stage 10 according to the third embodiment does not have the fixing part 11 described in the first embodiment.

The pressure bonding device 100 includes the vacuum chamber 5, the vacuum source 51, the pressure source 34, the stage 10, three bonding units 20F, the movable base 60, the control valves 31, 32, and 33, the pipes 36, 35, 52, and 53, restriction mechanisms 40, holding members 43, and the control device 30. In the bonding units 20F, the display panels 2 are attached to the respective diaphragms 4 with an adhesive layer interposed therebetween.

Figure 12:
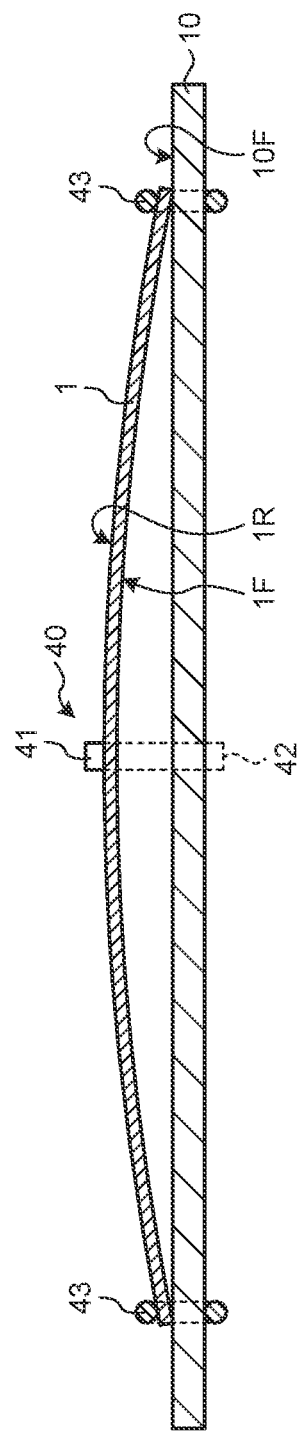
FIG. 12 is a schematic sectional view for explaining a restriction mechanism of the pressure bonding device according to the third embodiment.
Figure 13:
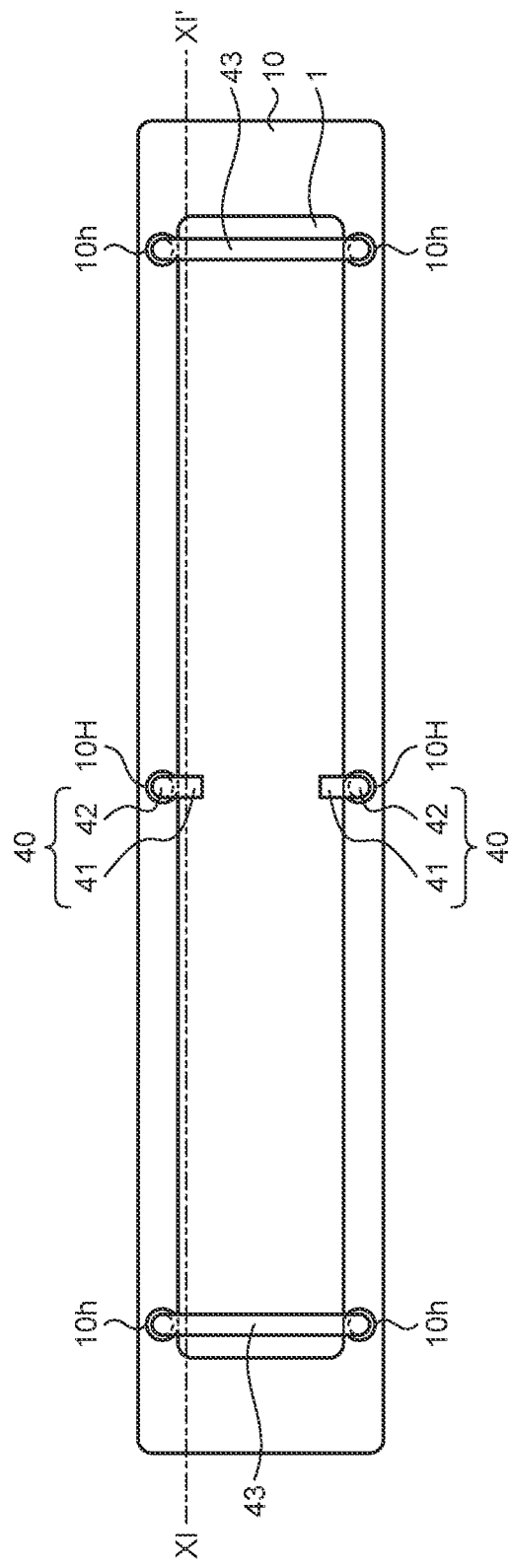
FIG. 13 is a schematic plan view for explaining the restriction mechanism of the pressure bonding device according to the third embodiment.

The restriction mechanism 40 restricts the front plate 1 such that the curved surface thereof is deformed into a flat surface. FIG. 12 is a schematic sectional view for explaining the restriction mechanism of the pressure bonding device according to the third embodiment. FIG. 13 is a schematic plan view for explaining the restriction mechanism of the pressure bonding device according to the third embodiment. FIG. 12 is a sectional view along line XI-XI' of FIG. 13.

Figure 14:
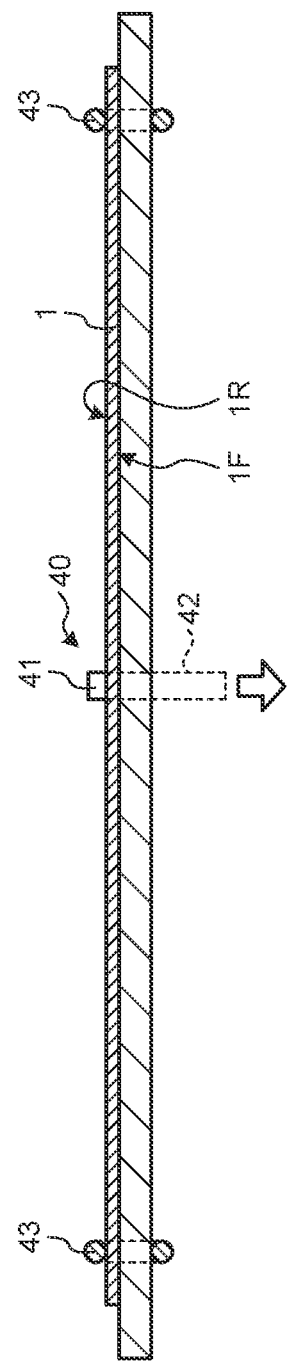
FIG. 14 is a schematic sectional view for explaining an operation of the restriction mechanism of the pressure bonding device according to the third embodiment.
Figure 15:
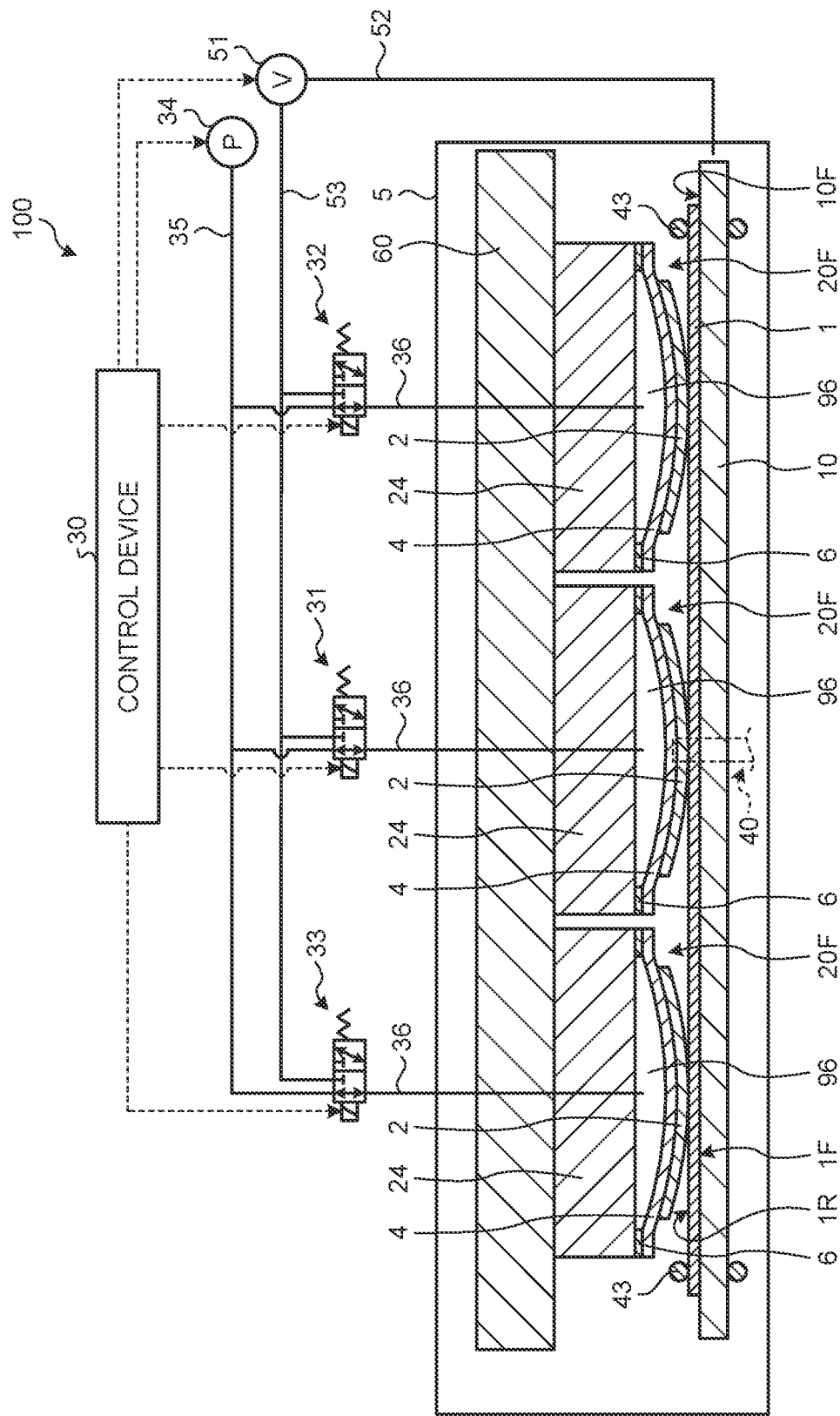
FIG. 15 is a configuration diagram for explaining operations of the pressure bonding device according to the third embodiment.

FIG. 14 is a schematic sectional view for explaining an operation of the restriction mechanism of the pressure bonding device according to the third embodiment. FIG. 15 is a configuration diagram for explaining operations of the pressure bonding device according to the third embodiment.

As illustrated in FIGS. 12 and 13, the restriction mechanisms 40 each include a support pole 42 and a claw 41 attached to the end of the support pole 42. The support pole 42 is disposed in a through hole 10H bored through the stage 10 and is vertically driven by a drive device, such as a motor, which is not illustrated. The claw 41 protrudes from the support pole 42 in planar view and has a length long enough to be caught on the end of the front plate 1.

As illustrated in FIGS. 12 and 13, the holding members 43 have a ring shape and are made of synthetic rubber, elastomer, or the like. The holding members 43 each pass through respective through holes 10h bored through the stage 10 and hold the front plate 1 on the stage 10 in a manner pressing the front plate 1 toward the stage 10.

The following describes a method for manufacturing a display device using the pressure bonding device 100 according to the third embodiment.

In the depressurization state, the control valves 31, 32, and 33 do not supply gas supplied from the pressure source 34 through the pipe 35 to the respective pipes 36. In the depressurization state, the control valves 31, 32, and 33 couple the vacuum source 51 and respective spaces 96 through the pipes 36 and the pipe 53. In the pressurization state, the control valves 31, 32, and 33 couple the pressure source 34 and the respective spaces 96 through the pipes 36 and the pipe 35. In the pressurization state, the control valves 31, 32, and 33 supply gas supplied from the pressure source 34 to the respective spaces 96.

At the preparation process, the display panels 2 are attached to the respective diaphragms 4 in the vacuum chamber 5 with an adhesive layer interposed therebetween as illustrated in FIG. 11. The display panels 2 are each provided with an adhesive layer also on the side facing the front plate 1. The adhesive layer on the diaphragm 4 has adhesion less than that of the adhesive layer facing the front plate 1.

At the preparation process, the restriction mechanisms 40 are brought into contact with the front plate 1 from above. The front plate 1 is inserted between the holding members 43 and the stage 10.

At a flattening process performed after the preparation process, the restriction mechanisms 40 move downward such that the claws 41 illustrated in FIG. 14 come closer to the stage 10. Before the diaphragms 4 are deformed, the display panels 2 serving as the second workpieces on the respective bonding units 20F are disposed parallel to the front plate 1 serving as the first workpiece.

After the flattening process, the depressurization process is performed to reduce the pressure in the vacuum chamber 5. The control device 30 brings the control valves 31, 32, and 33 into the depressurization state and drives the vacuum source 51 to control the operations of the vacuum source 51, thereby controlling the pressure in the vacuum chamber 5.

After the pressure in the vacuum chamber 5 is reduced to predetermined pressure, the pressure bonding process is performed to bond the display panels 2 to the front plate 1. The control device 30 brings the control valves 31, 32, and 33 into the pressurization state and increases the pressure in the spaces 96. At the pressure bonding process, pressure difference is generated between the pressure in the vacuum chamber 5 and the pressure in the spaces 96, thereby deforming the diaphragms 4. Consequently, the volume of the spaces 96 increases.

As a result, the distance between the diaphragms 4 and the front plate 1 of the stage 10 decreases, thereby bringing the display panels 2 attached to the respective diaphragms 4 into contact with the front plate 1. At this time, the front plate 1 has a flat plate shape. Consequently, as illustrated in FIG. 15, the display panels 2 (three display panels 2) are not pressed against the curved surface from the end of the display panels 2. At the pressure bonding process, the spaces 96 further expand, thereby bonding the entire surfaces of the three display panels 2 to the front plate 1.

At the detachment process performed after the pressure bonding process, the control valve 31 is switched from the pressurization state to the depressurization state so as to detach the diaphragm 4 from the display panel 2. After the diaphragms 4 are detached from the respective display panels 2, the restriction mechanisms 40 move upward such that the claws 41 move away from the stage 10 as illustrated in FIG. 12. The shape of the front plate 1 is restored by its elasticity, and the curved surface part appears. As a result, the display panels 2 are deformed along the shape of the second surface 1R of the front plate 1 corresponding to the curved surface of the front plate 1. Subsequently, the pressure in the vacuum chamber 5 is brought back to the atmospheric pressure, and the display device 3 illustrated in FIGS. 1 and 2 is taken out.

As described above, the pressure bonding device 100 includes the vacuum chamber 5, the restriction mechanisms 40, the stage 10, and the bonding units 20F. The restriction mechanisms 40 restrict the shape of the front plate 1. The stage 10 is disposed in the vacuum chamber 5 and has the flat surface 10F. The front plate 1 is pressed against the stage 10 by the restriction mechanisms 40. The bonding units 20F deform the respective elastic diaphragms 4 by internal pressures, thereby pressure-bonding the respective three display panels 2 to the second surface 1R of the front plate 1. The display panel 2 serving as one second workpiece is attached to one diaphragm 4, and the bonding units 20F are disposed facing the stage 10.

This configuration reduces difference in the amount of partial elongation generated in the display panels 2. The pressure bonding device 100 simultaneously bonds a plurality of display panels 2 serving as the plate-like second workpieces to the front plate 1 serving as the plate-like first workpiece having a curved surface part. Consequently, the display device 3 can be manufactured in a shorter time at a lower cost.

Alternatively, the pressure bonding device 100 can deform the diaphragms 4 of the respective bonding units 20F one by one, thereby pressure-bonding the display panels 2 serving as the second workpieces to the second surface 1R of the front plate 1 serving as the first workpiece.

Deforming the diaphragms 4 one by one can improve accuracy in the bonding positions and reduce deterioration in display quality. In addition, difference in the amount of partial elongation generated in the display panels 2 is reduced.

While the curvature of the curved surface part of the front plate 1 is constant across the entire surface, for example, the front plate 1 may have a plurality of curved surface parts like the second embodiment. The front plate 1 may have curved surface parts having different curvatures. The front plate 1 may have a plurality of curved surface parts including concave curved surface parts and convex curved surface parts.

As described above, according to the method for manufacturing the display device 3, a plurality of display panels 2 smaller than the front plate 1 can bonded to the translucent front plate 1 having a curved surface part. The method for manufacturing the display device 3 includes the preparation process, the flattening process, and the pressure bonding process. The preparation process includes attaching the display panels 2 to at least one elastic diaphragm 4 and attaching the front plate 1 to the flat stage 10 facing the diaphragm 4. The flattening process is performed before or after the preparation process and includes deforming the front plate 1 into a flat plate shape. The pressure bonding process is performed after the flattening process and includes deforming the diaphragm 4 by pressure and pressure-bonding the display panels 2 to different positions on the front plate 1.

The pressure for pressing the display panels 2 against the front plate 1 is likely to be uniform in the plane because the second surface 1R of the front plate 1 is flat. As a result, deterioration in display quality of the display panels 2 is reduced.

First Modification of the Third Embodiment

Figure 16:
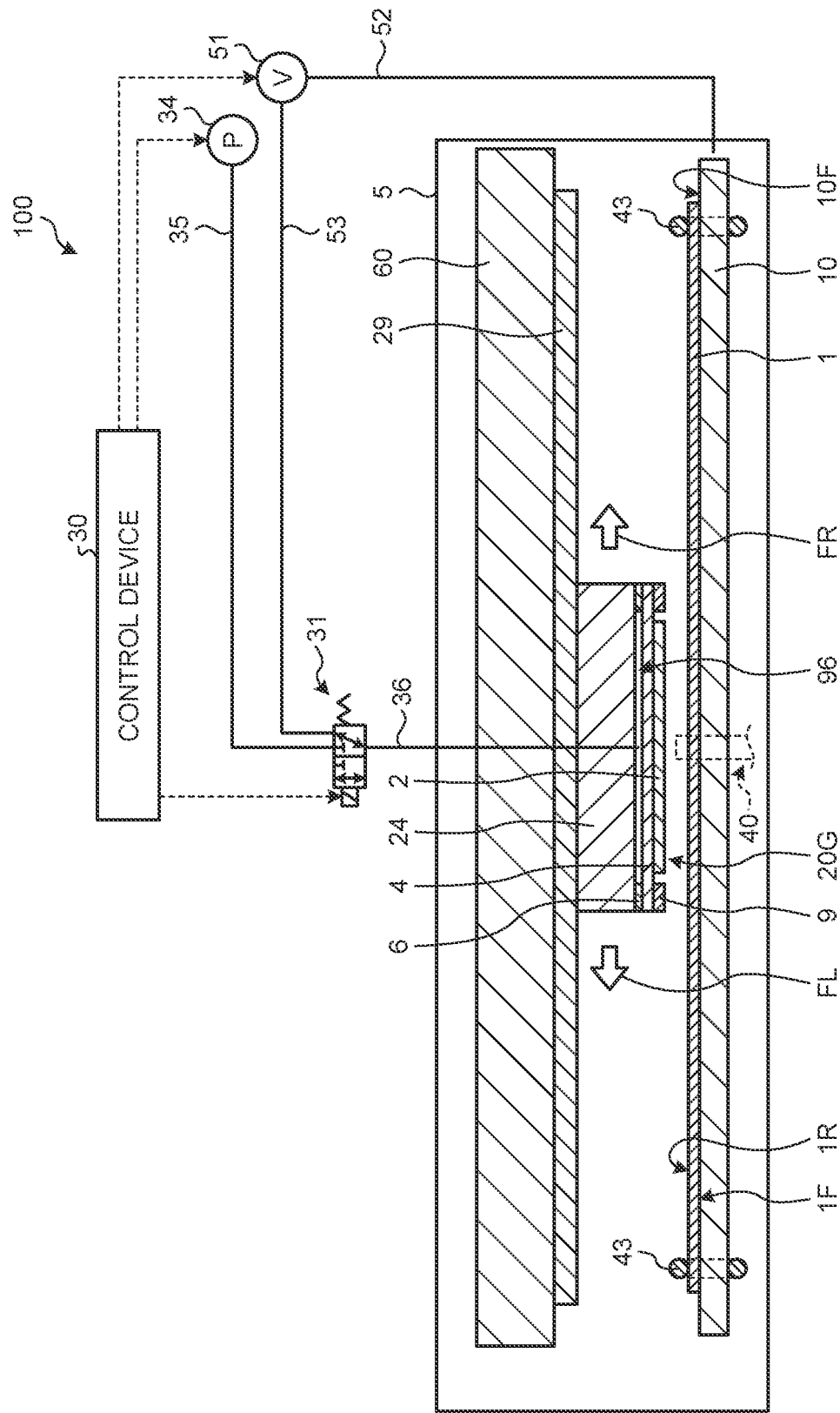
FIG. 16 is a configuration diagram of a pressure bonding device according to a first modification of the third embodiment.

FIG. 16 is a configuration diagram of a pressure bonding device according to a first modification of the third embodiment. In the description of the first modification of the third embodiment, the same components as those according to the first embodiment, the first modification of the first embodiment, the second embodiment, or the third embodiment are denoted by the same reference numerals, and detailed explanation thereof is omitted.

In the same manner as the pressure bonding device according to the third embodiment, the surface 10F of the stage 10 is a flat surface in the pressure bonding device 100 according to the first modification of the third embodiment. The stage 10 according to the first modification of the third embodiment does not have the fixing part 11 described in the first embodiment.

Unlike the pressure bonding device according to the third embodiment, the pressure bonding device 100 according to the first modification of the third embodiment includes one bonding unit 20G having the same configuration as that of the bonding unit 20A according to the first embodiment. The bonding unit 20G is attached to the movable base 60 with the guide mechanism 29 interposed therebetween. The guide mechanism 29 is a linear motion guide mechanism that supports the bonding unit 20G movably in the direction FL and the direction FR opposite to the direction FL along the longitudinal direction of the front plate 1 illustrated in FIG. 16. In the bonding unit 20G, the display panels 2 are attached to the respective diaphragms 4 with an adhesive layer interposed therebetween.

With this structure, the first modification of the third embodiment provides the advantageous effects similar to those of the third embodiment. In addition, the pressure bonding device 100 according to the first modification of the third embodiment can bond the display panels 2 at desired positions depending on the size of a various kinds of front plate 1.

Out of other advantageous effects provided by the aspects described in the embodiments above, advantageous effects clearly defined by the description in the present specification or appropriately conceivable by those skilled in the art are naturally provided by the present disclosure.

The configuration described above may be provided as the following aspect:

a method for manufacturing a display device by bonding, to a translucent front plate having a curved surface part, a plurality of display panels smaller than the front plate, the method including:

preparing including attaching the display panels to at least one elastic diaphragm and attaching the front plate to a flat stage facing the at least one diaphragm;

flattening performed before or after the preparing and including deforming the front plate into a flat plate shape; and pressure-bonding performed after the flattening and including deforming a plurality of the diaphragms by individual pressures and pressure-bonding the display panels to different positions on the front plate.

What is claimed is:

1. A method for manufacturing a display device by bonding, to a translucent front plate having a curved surface part, a plurality of display panels smaller than the front plate, the method comprising:

preparing including attaching the display panels to respective elastic diaphragms and attaching the front plate to a stage facing the diaphragms; and pressure-bonding performed after the preparing and including deforming the diaphragms by individual pressures and pressure-bonding the display panels to different positions on the front plate.

2. The method for manufacturing a display device according to claim 1, wherein the curvature of the curved surface part of the front surface is constant across the entire surface.

3. The method for manufacturing a display device according to claim 1, wherein the front plate has a plurality of the curved surface parts having different curvatures.

4. The method for manufacturing a display device according to claim 1, wherein the front plate has a plurality of the curved surface parts including a concave curved surface part and a convex curved surface part.

* * * * *